United States Patent
French, Jr.

(10) Patent No.: US 10,281,905 B2
(45) Date of Patent: May 7, 2019

(54) CONTROL SYSTEM FOR AGRICULTURAL EQUIPMENT

(71) Applicant: Deere & Company, Moline, IL (US)

(72) Inventor: William D. French, Jr., Bettendorf, IA (US)

(73) Assignee: Deere & Company, Moline, IL (US)

( * ) Notice: Subject to any disclaimer, the term of this patent is extended or adjusted under 35 U.S.C. 154(b) by 138 days.

(21) Appl. No.: 14/862,497

(22) Filed: Sep. 23, 2015

(65) Prior Publication Data

US 2017/0083006 A1    Mar. 23, 2017

(51) Int. Cl.
| | |
|---|---|
| G05B 19/4155 | (2006.01) |
| A01B 69/00 | (2006.01) |
| A01D 41/127 | (2006.01) |
| G06Q 50/02 | (2012.01) |
| A01D 41/14 | (2006.01) |

(52) U.S. Cl.
CPC .......... *G05B 19/4155* (2013.01); *A01B 69/00* (2013.01); *A01D 41/127* (2013.01); *G06Q 50/02* (2013.01); *A01D 41/141* (2013.01); *G05B 2219/41244* (2013.01); *G05B 2219/45106* (2013.01)

(58) Field of Classification Search
CPC .... A01B 69/00; A01D 41/127; A01D 41/141; G05B 19/4155; G05B 2219/41244; G05B 2219/45106; G06Q 50/02
See application file for complete search history.

(56) References Cited

U.S. PATENT DOCUMENTS

| | | | |
|---|---|---|---|
| 4,458,471 A | 7/1984 | Herwig | |
| 4,648,040 A | 3/1987 | Cornell | |
| 4,770,065 A * | 9/1988 | Woyton | F16H 61/66236 318/624 |
| 5,359,836 A | 11/1994 | Zeuner | |
| 5,875,109 A * | 2/1999 | Federspiel | G05B 13/024 700/40 |
| 6,285,883 B1 | 9/2001 | Bringby et al. | |
| 8,594,914 B2 | 11/2013 | Bauerle et al. | |
| 2009/0192634 A1* | 7/2009 | Fujinaka | G05B 11/42 700/42 |
| 2013/0090747 A1* | 4/2013 | Grieb | G05B 13/0205 700/28 |
| 2013/0116895 A1* | 5/2013 | Smith | A01F 15/08 701/50 |
| 2016/0223673 A1* | 8/2016 | Smith | G01S 17/89 |

OTHER PUBLICATIONS

Extended European Search Report Application No. 16184279.4 dated Mar. 1, 2017, 7 pages.

* cited by examiner

*Primary Examiner* — Yuhui R Pan

(74) *Attorney, Agent, or Firm* — Joseph R. Kelly; Kelly, Holt & Christenson PLLC

(57) ABSTRACT

In an agricultural machine, sensor signal variability is identified, over a period of time. A control system deadband is identified, based upon the sensor signal variability. A control system uses the control system deadband to control the agricultural machine.

12 Claims, 7 Drawing Sheets

CONTROL SYSTEM FOR AGRICULTURAL EQUIPMENT

FIELD OF THE DESCRIPTION

The present description relates to agricultural equipment. More specifically, the present description relates to a control system for controlling agricultural equipment.

BACKGROUND

There are many different kinds of agricultural equipment. Some such equipment can include, for instance, harvesters, seeders and planters, tillage equipment, sprayers, to name a few. Such equipment can include sensors that sense a variety of different variables. A control system can generate control signals to control different components or subsystems on the equipment, based upon the sensor signals.

Such sensor signals often include different kinds of noise. Measurement noise, for instance, can be introduced by the measurement instruments (e.g., the sensors and other measurement components). Process noise can be introduced by variations in the particular variable that is being sensed, where those variations should not impact the control system. In the latter case, it may be that the sensor and corresponding instrumentation is measuring the variable correctly, but the variable has a value that varies, naturally, within a given range, and that variation should not be used to affect the control system.

The discussion above is merely provided for general background information and is not intended to be used as an aid in determining the scope of the claimed subject matter.

SUMMARY

In an agricultural machine, sensor signal variability is identified, over a period of time. A control system deadband is identified, based upon the sensor signal variability. A control system uses the control system deadband to control the agricultural machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, some sensor signals in agricultural machines can have noise components (such as measurement noise and process noise) that result in signal variability. For instance, in some agricultural systems, the signal being measured may be sensed by instrumentation that has its own variability. This noise is referred to as measurement noise. Process noise, on the other hand, results when the sensor is accurately sensing the sensed variable, but the variable itself has some degree of variability. By way of example, in an agricultural machine, it may be that a control system attempts to control an implement so it that it is held a given distance off the ground in a field being harvested. It may be that the ground is relatively bumpy. This can cause the sensor signal to fluctuate rapidly, even over short distances traveled, because of the bumps. However, it may not be desirable for the control system to react to each of these variations. Thus, the present system identifies a control deadband that accommodates the signal variability (whether it's from measurement noise or process noise or other sources) and controls the agricultural equipment using that deadband. It should also be noted that the terms "hysteresis" and "deadband" are used herein. In one example, a deadband is a range of a signal input value that does not cause a control output, and hysteresis defines a range of signal input values where the control output is dependent on previous signal values or control output states. Thus, when one term is used herein, it is intended to cover or include the other term as well. Thus, the term deadband is intended to include hysteresis, and vice versa.

Figure 1:
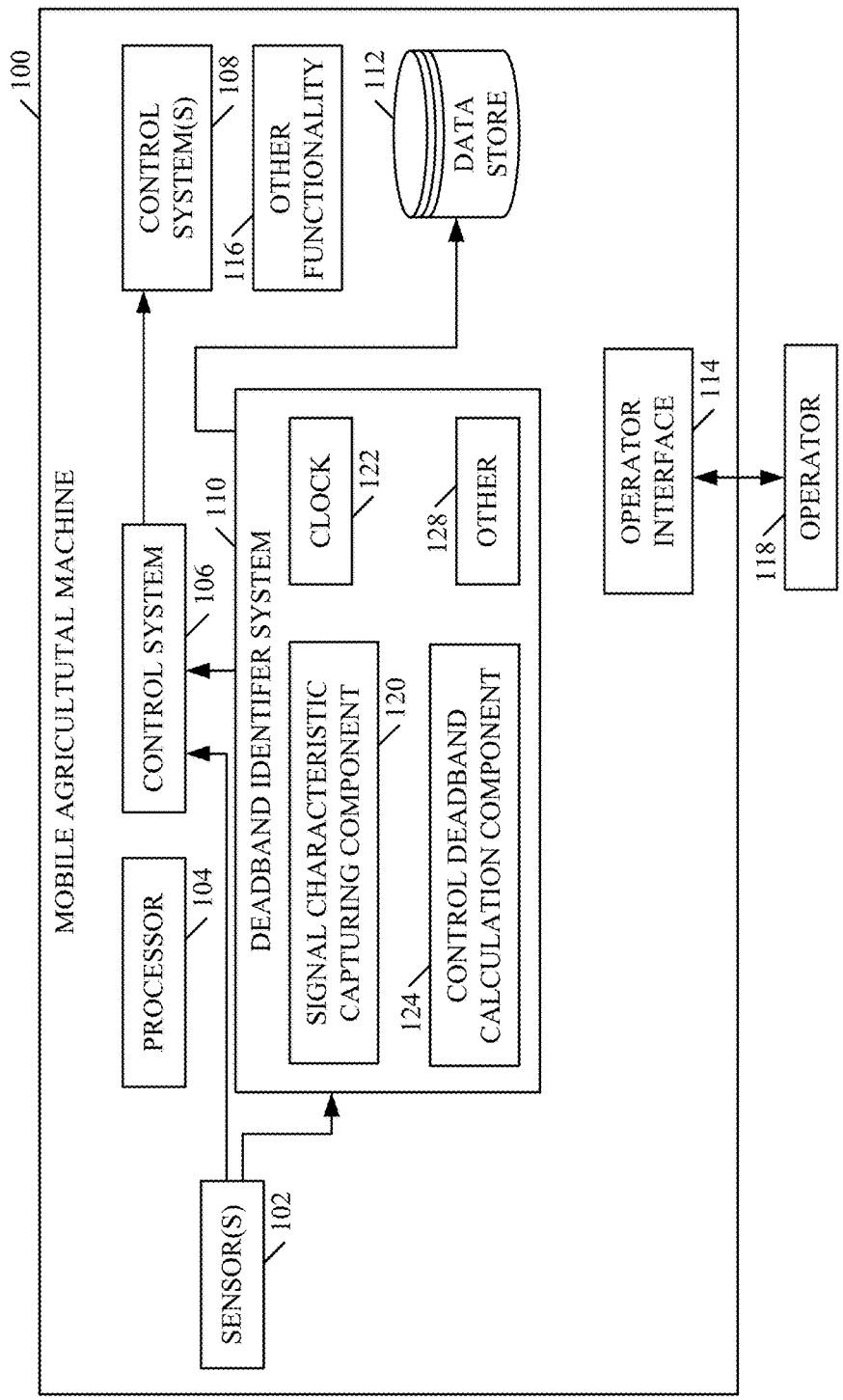
FIG. 1 is a block diagram of one example of a mobile agricultural machine.

FIG. 1 is a block diagram of one example of an agricultural machine 100. Agricultural machine 100 illustratively includes one or more sensors 102, one or more processors 104, a control system 106, a set of controlled systems or subsystems 108, and a deadband identifier system 110. FIG. 1 also shows that, in one example, machine 100 can include a data store 112, an operator interface 114, and it can include a wide variety of other functionality 116.

In one example, operator interface 114 includes operator input mechanisms and output mechanisms. The output mechanisms can be mechanisms that can convey information to the operator, such as visual display devices, audio devices, haptic feedback devices, etc. The operator input mechanisms can include a wide variety of different mechanisms that can be actuated by an operator 118 to control and manipulate various systems and subsystems of mobile agricultural machine 100. The operator input mechanisms, for instance, can include levers, steering wheels, pedals, joysticks, buttons, keypads, user input mechanisms on user interface displays, among a wide variety of other input mechanisms.

In the example shown in FIG. 1, control system 106 illustratively receives sensor signals from sensors 102 and generates control signals to control the various controlled systems or subsystems 108. In addition, deadband identifier system 110 illustratively identifies a deadband associated with each of the sensor signals and provides that deadband to control system 106, so that control system 106 can accommodate various levels of signal variability on the sensor signals generated by sensors 102.

In one example, deadband identifier system 110 illustratively includes signal characteristic capturing component 120, a clock or timing mechanism 122, control deadband calculation component 124, and it can include other items 128. Signal characteristic capturing component 120 illustratively captures a signal characteristic of each of the different sensor signals 102 for which a deadband is to be identified. In one example, it can capture the signal characteristic over a given period of time, as timed by clock 122. Once the signal characteristic has been captured for a given sensor signal, control deadband calculation component 124 calculates (or otherwise identifies) a deadband associated with that sensor signal. The deadband can be provided to control system 106 for use in controlling the controlled systems or subsystems 108. It can also be stored in data store 112, or output for other reasons (such as to remote systems, etc.). It can also be output to operator interface 114 where it can be displayed or otherwise surfaced for operator 118.

Figure 2:
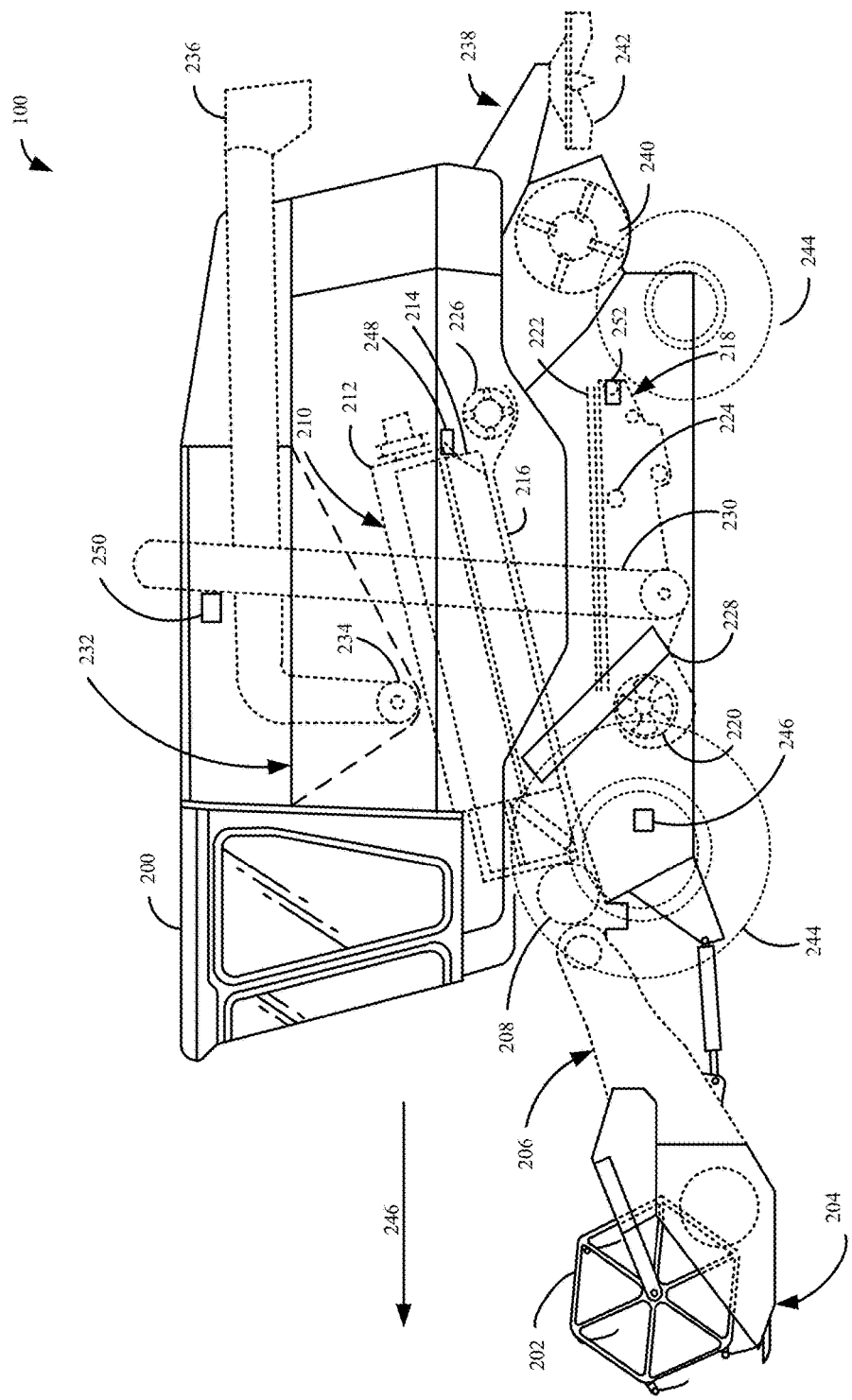
FIG. 2 is a partial pictorial, partial schematic, view of an example where the mobile agricultural machine is a combine.

Before describing the operation of deadband identifier system 110 in more detail, one example of a mobile agricultural machine 100 will first be described. FIG. 2 is a partial pictorial, partial schematic illustration of machine 100, in an example where machine 100 is a combine. It can be seen in FIG. 2 that combine 100 illustratively includes an operator compartment 200, and a set of front end equipment that can include header 202, and a cutter generally indicated at 204. It can also include a feeder house 206, a feed accelerator 208, and a thresher generally indicated at 210. Thresher 210 illustratively includes a threshing rotor 212 and a set of concaves 214. Further, combine 100 can include a separator 216 that includes a separator rotor. Combine 102 can include a cleaning subsystem (or cleaning shoe) 218 that, itself, can include a cleaning fan 220, chaffer 222 and sieve 224. The material handling subsystem in combine 102 can include (in addition to a feederhouse 206 and feed accelerator 208) discharge beater 226, tailings elevator 228, clean grain elevator 230 (that moves clean grain into clean grain tank 232) as well as unloading auger 234 and spout 236. Combine 102 can further include a residue subsystem 238 that can include chopper 240 and spreader 242. Combine 102 can also have a propulsion subsystem that includes an engine that drives ground engaging wheels 244 or tracks, etc. It will be noted that combine 102 may also have more than one of any of the subsystems mentioned above (such as left and right cleaning shoes, separators, etc.).

In operation, and by way of overview, combine 102 illustratively moves through a field in the direction indicated by arrow 246. As it moves, header 202 engages the crop to be harvested and gathers it toward cutter 204. After it is cut, it is moved by a conveyor in feeder house 206 toward feed accelerator 208, which accelerates the crop into thresher 210. The crop is threshed by rotor 212 rotating the crop against concave 214. The threshed crop is moved by a separator rotor in separator 216 where some of the residue is moved by discharge beater 226 toward the residue subsystem 238. It can be chopped by residue chopper 240 and spread on the field by spreader 242. In other implementations, the residue is simply dropped in a windrow, instead of being chopped and spread.

Grain falls to cleaning shoe (or cleaning subsystem) 218. Chaffer 222 separates some of the larger material from the grain, and sieve 224 separates some of the finer material from the clean grain. Clean grain falls to an auger in clean grain elevator 230, which moves the clean grain upward and deposits it in clean grain tank 232. Residue can be removed from the cleaning shoe 218 by airflow generated by cleaning fan 220. That residue can also be moved rearwardly in combine 102 toward the residue handling subsystem 238.

Tailings can be moved by tailings elevator 228 back to thresher 210 where they can be re-threshed. Alternatively, the tailings can also be passed to a separate re-threshing mechanism (also using a tailings elevator or another transport mechanism) where they can be re-threshed as well. FIG. 2 also shows that, in one example, combine 102 can include ground speed sensor 246, one or more separator loss sensors 248, a clean grain camera 250, and one or more cleaning shoe loss sensors 252. Ground speed sensor 246 illustratively senses the travel speed of combine 102 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 252 illustratively provide an output signal indicative of the quantity of grain loss by both the right and left sides of the cleaning shoe 218. In one example, sensors 252 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 252 can comprise only a single sensor as well, instead of separate sensors for each shoe.

Separator loss sensor 248 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 248 may also comprise only a single sensor, instead of separate left and right sensors.

It will also be appreciated that sensors 102 in FIG. 1 (in addition to the sensors already described) can include other sensors on combine 100 as well. For instance, they can include a machine state sensor that is configured to sense whether machine 100 is configured to chop the residue, drop a windrow, etc. They can include cleaning shoe fan speed sensors that can be configured proximate fan 220 to sense the speed of the fan. They can include a material other than grain (MOG) moisture sensor that can be configured to sense the moisture level of the material other than grain that is passing through machine 100. They can include machine setting sensors that are configured to sense the various configurable settings on machine 100. They can also include a machine orientation sensor that can be any of a wide variety of different types of sensors that sense the orientation of machine 100. The sensed orientation can identify the orientation of machine 100, or the position of parts of machine 100 relative to other parts, or relative to the ground (such as a the height of header 202 above the ground) etc. Crop property sensors can sense a variety of different types of crop properties, such as crop type, crop moisture, and other crop properties. They can also be configured to sense characteristics of the crop as they are being processed by machine 100. For instance, they can sense grain feed rate, as it travels through clean grain elevator 230. They can sense mass flow rate through elevator 230, or provide other output signals indicative of similar variables.

Figure 3:
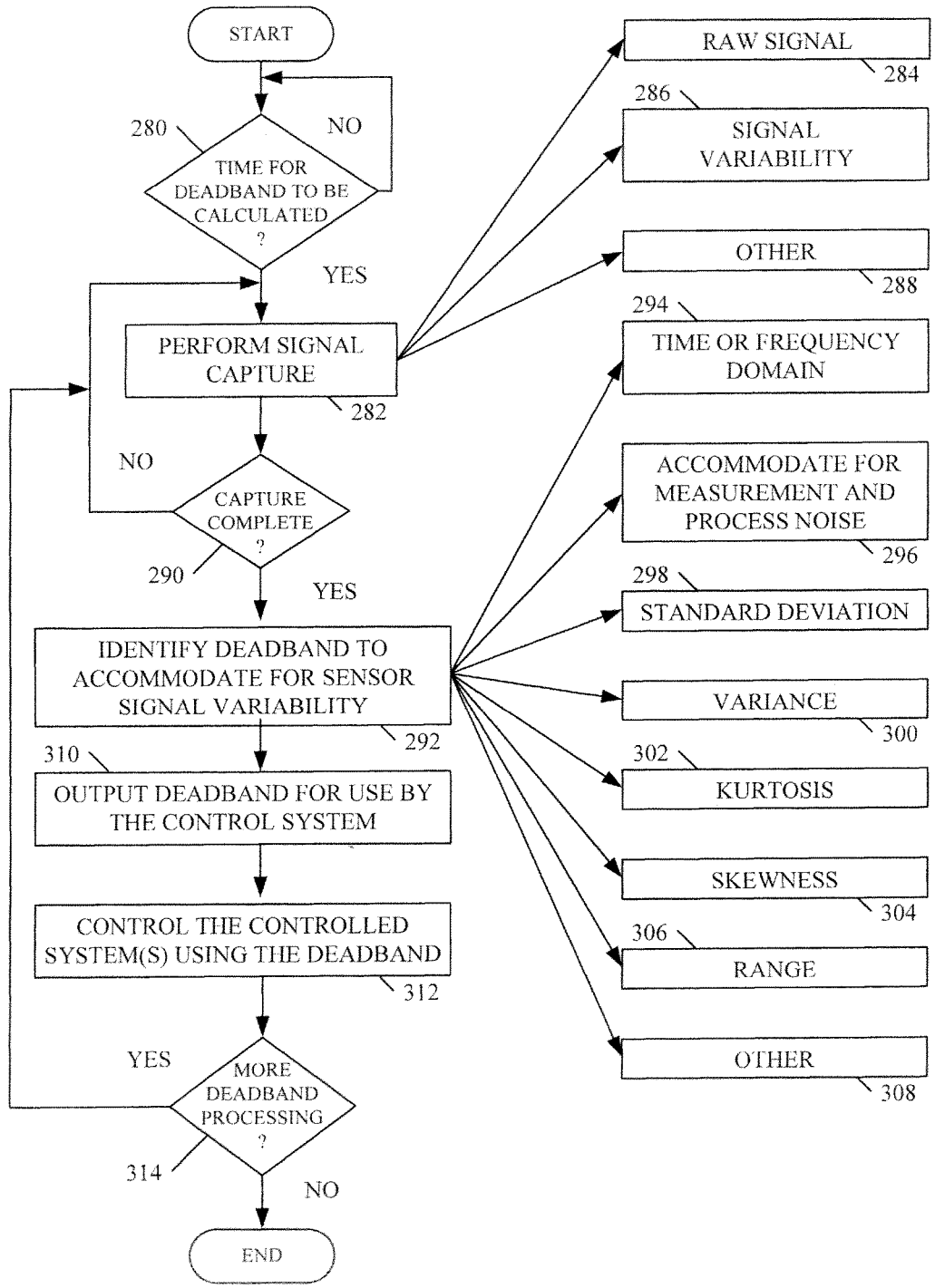
FIG. 3 is a flow diagram illustrating one example of the operation of a deadband identifier system in the mobile agricultural machine.

FIG. 3 is a flow diagram illustrating one example of the operation of deadband identifier system 110, in more detail. In one example, system 110 can be triggered to automatically identify deadbands used to control the machine in different ways. By automatically, it is meant that the system identifies the deadbands without human involvement, except perhaps to initiate or authorize the process or the like. For instance, the operator may commence operation in a field, and provide a manual input to start the process of identifying deadbands. In that case, that would trigger deadband identifier system 110 to begin an automatic deadband identification process. In another example, system 110 can automatically perform a deadband identification process when its operation begins (e.g., if it's a harvester, when harvesting operations begin, etc.). It can also intermittently repeat the deadband identification process during its operation. For instance, it can repeat the process periodically, or in response to other triggers. By way of example, if a sensor signal has a variability that increases relatively quickly, or decreases relatively quickly, that may trigger system 110 to perform a deadband identification process. Other triggers can be used as well.

In any case, at some point, deadband identifier system 110 determines that it is time to perform a deadband identification process. This is indicated by block 280 in FIG. 3.

Signal characteristic capturing component 120 then selects one or more sensor signals for which a deadband is to be identified, and begins capturing a pre-determined characteristic of each of those signals. It can do this one signal at a time, or it can do this for multiple signals, simultaneously. Performing signal capture is indicated by block 282. It will be noted that the sensor signals can be from any of the sensors discussed above with respect to FIG. 2, or other sensor signals.

In one example, component 120 captures raw signal values for a pre-determined period of time. This is indicated by block 284. The pre-determined period of time may be, for instance, between 45 seconds and two minutes. This is an example only, and shorter or longer time periods can be used to perform signal capture as well. In addition, the signal capture can be performed continuously as is described in greater detail below.

In another example, it captures a signal variability value that identifies a signal scatter, or a signal variability, that has occurred over the per-determined period of time. This is indicated by block 286. It can capture other signal characteristics that may be used in identifying the variability or scatter in the signal as well, and this is indicated by block 288.

At some point, the signal capture will be complete, as indicated by block 290. It will be noted, however, that signal capture may be performed continuously or substantially continuously. In such an example, it may be that the deadband processing is performed continuously, in a rolling way, on the various sensor signals, as they are generated by the various sensors. This example is also contemplated herein.

Once the signal characteristic has been captured, control deadband calculation component 124 identifies a deadband for each of the signals, to accommodate for the sensor signal variability in that signal, as identified based upon the captured signal characteristic. Identifying the deadband to accommodate for the signal variability is indicated by block 292. This can be done in a wide variety of different ways. For instance, it can be done in the time domain or in the frequency domain. This is indicated by block 294. If done in the frequency domain, a transform component performs a transformation to get the signal into the frequency domain, and a frequency component identifier identifies the energy in the sensor signal in different frequency ranges. The high frequency components (e.g., those components representing the signal variability) are filtered out of the sensor signal by a filter so that the control system will not react to the high frequency components of the signal. When done in the time domain, the signal variability can be identified, and the deadband can simply by set wide enough to accommodate for the signal variability. Control deadband calculation component 124 thus calculates a deadband that will accommodate for both measurement noise and process noise. This is indicated by block 296.

It can do this by performing a statistical calculation as well. For instance, it can record (as the captured signal characteristic) signal values for the sensor signal at discrete periods of time within the pre-determined time period over which the characteristic was captured. It can then quantify the signal variability statistically, such as by calculating a standard deviation based on those signal values. This is indicated by block 298. It can use the standard deviation as the deadband, or it can multiply the standard deviation by a fixed multiplier amount which can be determined empirically or otherwise.

It can also perform other calculations to identify the variability in the signal values. For instance, it can calculate the signal variance 300, the signal kurtosis 302, the signal skewness 304, the signal range 306, or a wide variety of other characteristics of the signal as indicated by block 308. Again, the calculation can be a running calculation. For instance, if the standard deviation is used, it can be a running standard deviation calculation performed on the signal of interest over the pre-determined time period. In this way, the deadband can be easily calculated dynamically. Control deadband calculation component 124 then outputs the deadband for use by control system 106 in controlling the controlled systems or subsystems 108. Outputting the deadband is indicated by block 310.

Control system 106 then uses the deadband in controlling systems 108. This is indicated by block 312. The subsystem can include those mentioned above with respect to FIG. 2 (e.g., the threshing subsystem, the material handling subsystem, the propulsion subsystem, the front end equipment subsystem, the residue handling subsystem, the cleaning or separating subsystems, etc.) or other subsystems. The control can be accomplished in a wide variety of different ways. For instance, it may be that control system 106 is attempting to control controlled systems or subsystems 108 to a set point. The corresponding sensor signal is compared to the set point, and the controller reacts to the difference between the two. In agricultural systems, however, the signal being sensed can be very noisy. If the signal value is near the set point, the process noise or measurement noise may cause the signal value to rapidly go above and below the set point. This would cause the control system 106 to begin rapidly fluctuating between activating a deactivating the control signal that it generates based upon the set point and the sensor signal. By including the deadband (which can be a region above or around the set point) the system activates when the sensor signal exceeds the deadband (or an upper bound of the deadband) and deactivates when the sensor signal drops below the set point (or the lower bound of the deadband). Thus, rapid activation and deactivation can be avoided.

Deadband identifier system 110 then determines whether there is more deadband processing to be performed at this time. For instance, it may be time to identify or update deadbands for other signals. This is indicated by block 314. If so, processing reverts to block 282. The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands. A number of data stores have also been discussed. It will be noted they can each be broken into multiple data stores. All can be local to the systems accessing them, all can be remote, or some can be local while others are remote. All of these configurations are contemplated herein. Also, the figures show a number of blocks with functionality ascribed to each block. It will be noted that fewer blocks can be used so the functionality is performed by fewer components. Also, more blocks can be used with the functionality distributed among more components.

It will also be noted that the elements of FIG. 1, or portions of them, can be disposed on a wide variety of different devices. Some of those devices include various types of computers, laptop computers, tablet computers, or other mobile devices, such as palm top computers, cell phones, smart phones, multimedia players, personal digital assistants, etc.

Figure 4:
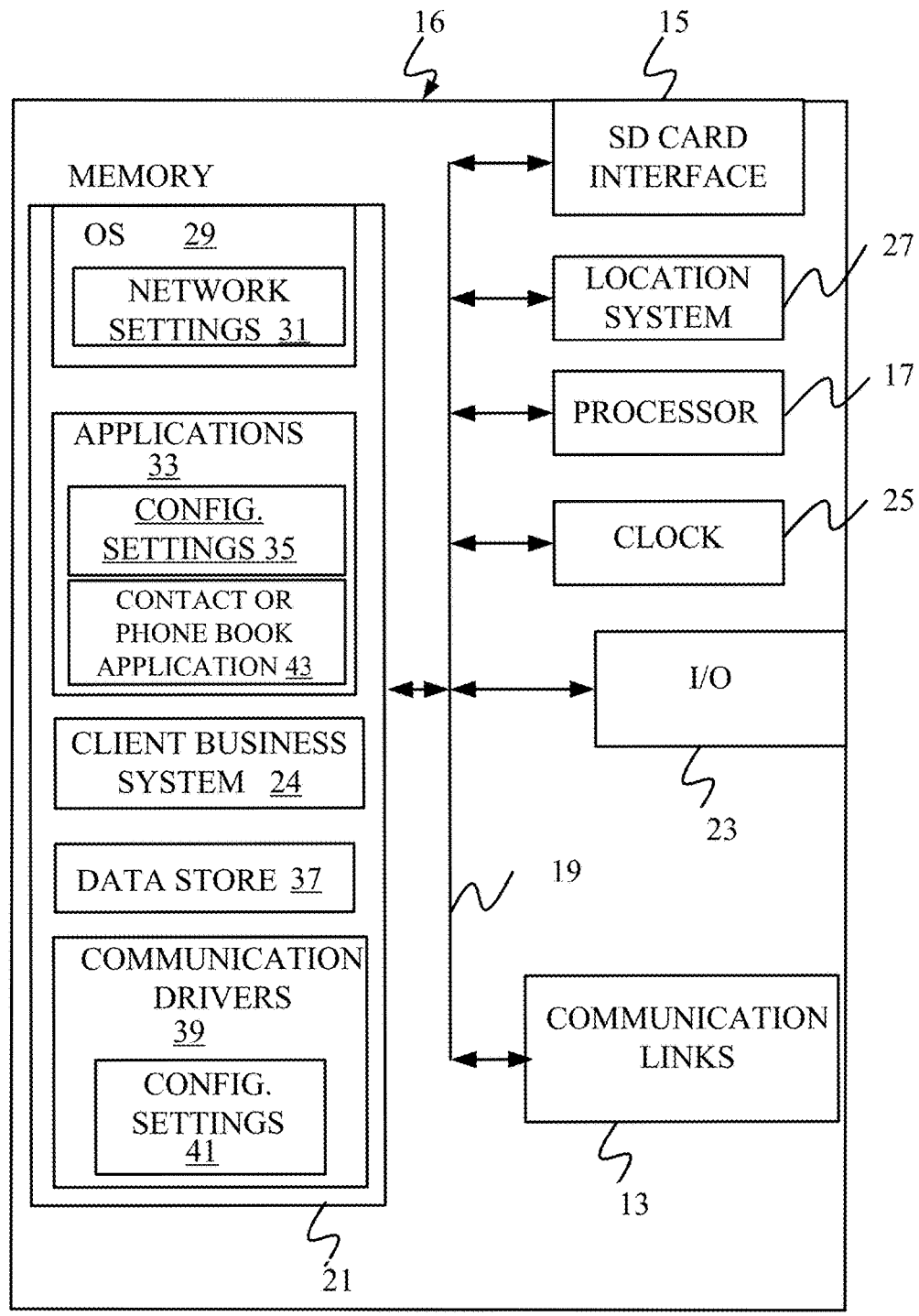
FIGS. 4-6 show examples of mobile devices that can be used by an operator of the mobile agricultural machine.
Figure 5:
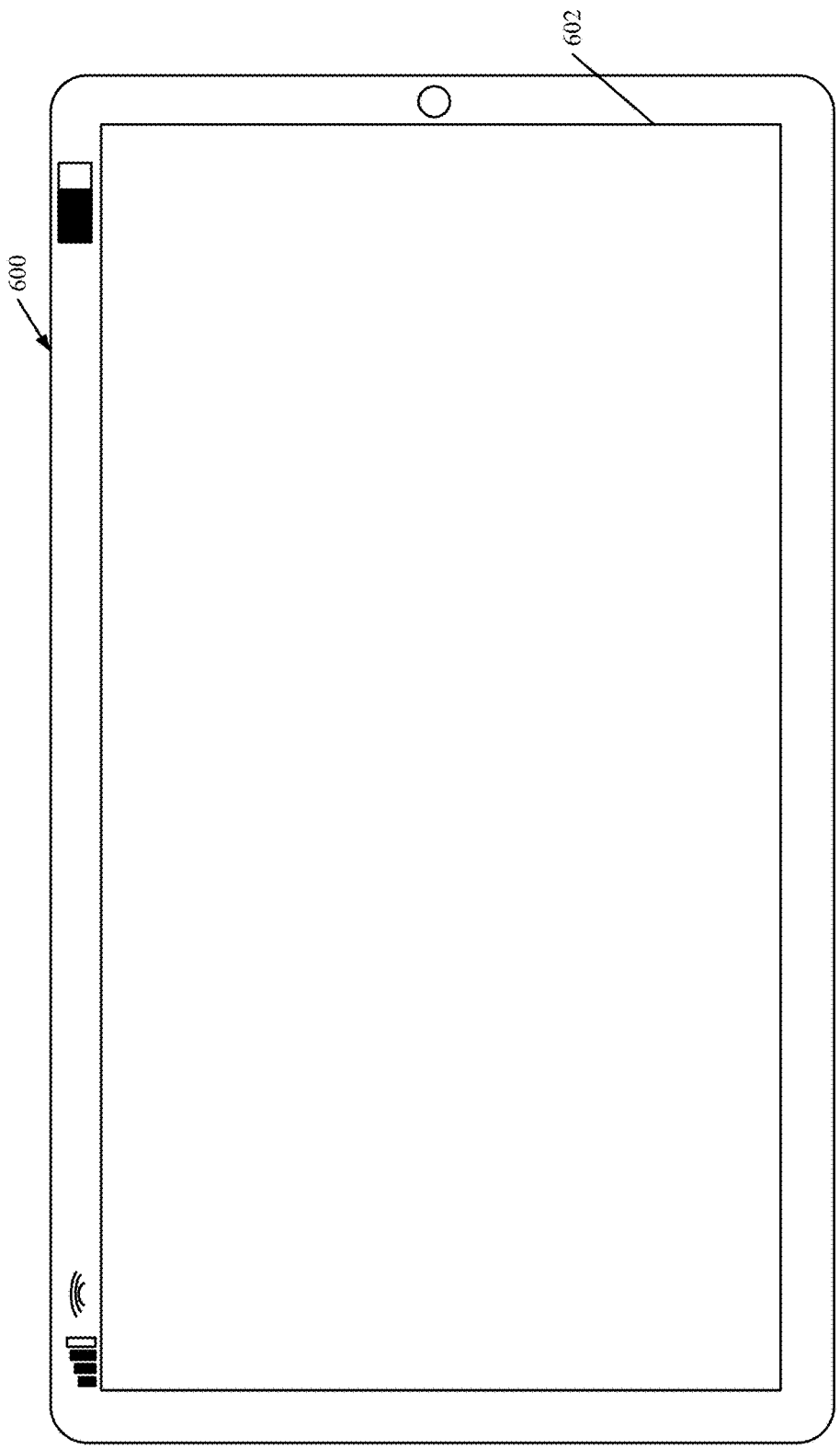
Figure 6:
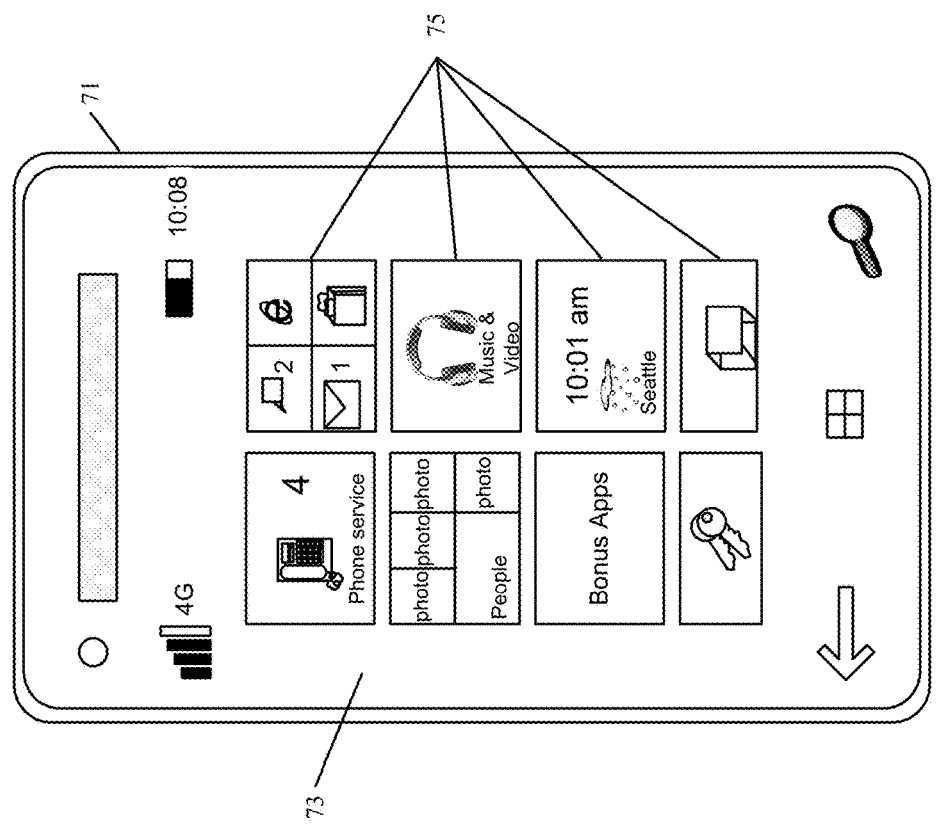

FIG. 4 is a simplified block diagram of one illustrative embodiment of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the deadbands. FIGS. 5-6 are examples of handheld or mobile devices.

FIG. 4 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processor 104 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 5 shows one example in which device 16 is a tablet computer 600. In FIG. 5, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 6 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 7:
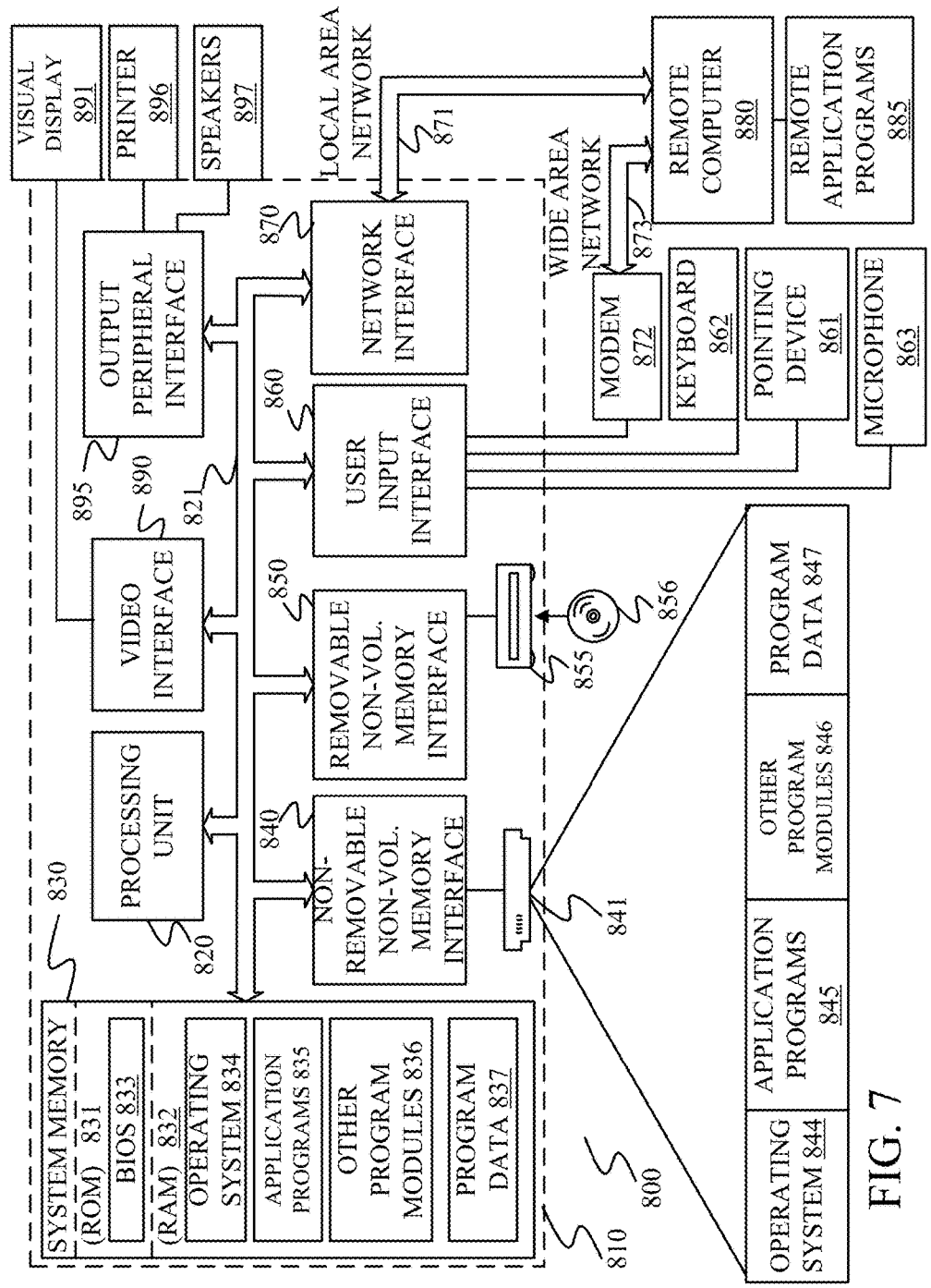
FIG. 7 is a block diagram of one example of a computing environment that can be used in the mobile agricultural machine.

FIG. 7 is one example of a computing environment in which elements of FIG. 1, or parts of it, (for example) can be deployed. With reference to FIG. 7, an example system for implementing some embodiments includes a general-purpose computing device in the form of a computer 810. Components of computer 810 may include, but are not limited to, a processing unit 820 (which can comprise processor 104), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal. The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 7 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is an agricultural machine, comprising:
a plurality of different subsystems, each performing a function of the agricultural machine;
a plurality of different sensors that sense variables and generate sensor signals indicative of the sensed variables;
a deadband identification system that identifies a deadband corresponding to each of the sensor signals; and
a control system that generates action signals for controlling the plurality of different subsystems, based on the sensor signals and the deadbands.

Example 2 is the agricultural machine of any or all previous examples wherein the deadband identification system comprises:
a signal characteristic capture component that captures a signal characteristic of a given one of the sensor signals over a given time period.

Example 3 is the agricultural machine of any or all previous examples wherein the deadband identification system comprises:
a deadband identifier that identifies a given deadband corresponding to the given sensor signal based on the captured signal characteristic of the given sensor signal.

Example 4 is the agricultural machine of any or all previous examples wherein the signal characteristic capture component is configured to capture a set of discrete sensor signal values for the given sensor signal, as the signal characteristic.

Example 5 is the agricultural machine of any or all previous examples wherein the deadband identifier comprises:
a statistical calculation component that statistically identifies a measure of signal variability of the given sensor signal based on the discrete sensor signal values and that identifies the given deadband based on the measure of signal variability.

Example 6 is the agricultural machine of any or all previous examples wherein the statistical calculation component is configured to calculate a standard deviation of the discrete sensor signal values as the measure of signal variability and to identify the given deadband based on the standard deviation calculated.

Example 7 is the agricultural machine of any or all previous examples wherein the statistical calculation component is configured to calculate the measure of signal variability as at least one of: kurtosis, variance, skewness or range of the discrete sensor signal values.

Example 8 is the agricultural machine of any or all previous examples wherein the deadband identifier comprises:
a transform component that transforms the given sensor into a frequency domain;
a frequency component identifier that identifies frequency components to be filtered; and
a filter that filters out the identified frequency components from the given sensor signal to obtain a filtered sensor signal, the control system generating the action signals based on the filtered sensor signal.

Example 9 is the agricultural machine of any or all previous examples wherein the deadband identification system dynamically identifies the deadband corresponding to each of the sensor signals, intermittently, during operation.

Example 10 is the agricultural machine of any or all previous examples wherein the agricultural machine comprises a combine and wherein the plurality of subsystems include one or more of a threshing subsystem, a propulsion subsystem, a separating subsystem, a front end equipment subsystem, a material handling subsystem and a residue handling subsystem.

Example 11 is a method of controlling an agricultural machine, comprising:
sensing a plurality of different variables;
generating a plurality of different sensor signals, each indicative of a corresponding sensed variable;
automatically identifying a measure of signal variability corresponding to each of the different sensor signals; and
generating action signals to control a plurality of different subsystems on the agricultural machine, based on the sensor signals and the identified measure of signal variability.

Example 12 is the method of any or all previous examples and further comprising:
identifying a deadband corresponding to each sensor signal based on the corresponding measure of signal variability, intermittently, during operation of the agricultural machine.

Example 13 is the method of any or all previous examples wherein generating action signals comprises:
generating the action signals based on the deadband corresponding to each of the sensor signals.

Example 14 is the method of any or all previous examples wherein identifying the measure of signal variability comprises:
capturing a set of discrete sensor signal values for a given one of the sensor signals over a given time period; and
calculating a standard deviation of the discrete sensor signal values as the measure of signal variability.

Example 15 is the method of any or all previous examples wherein identifying the measure of signal variability comprises:
capturing a set of discrete sensor signal values for a given one of the sensor signals over a given time period; and
calculating the measure of signal variability as at least one of: kurtosis, variance, skewness or range of the discrete sensor signal values.

Example 16 is the method of any or all previous examples wherein the plurality of subsystems include one or more of a threshing subsystem, a propulsion subsystem, a separating subsystem, a front end equipment subsystem, a material handling subsystem and a residue handling subsystem, and wherein generating the action signals comprises:
controlling the one or more subsystems.

Example 17 is an agricultural machine, comprising:
a plurality of different subsystems, each performing a function of the agricultural machine;
a plurality of different sensors each sensing a corresponding variable and generating a sensor signal indicative of the corresponding variable;
a variability identifying component configured to automatically identify a measure of signal variability corresponding to each of the different sensor signals; and
a control system that controls the plurality of different subsystems on the agricultural machine, based on the sensor signals and the identified measure of signal variability.

Example 18 is the agricultural machine of any or all previous examples wherein the variability identifying component comprises:
a deadband identifying system that identifies a deadband corresponding to each sensor signal based on the corresponding measure of signal variability, intermittently, during operation of the agricultural machine, the control system controlling the plurality of different subsystems based on the deadband corresponding to each of the sensor signals.

Example 19 is the agricultural machine of any or all previous examples wherein the deadband identifying system comprises:
a signal characteristic capturing component configured to capture a set of discrete sensor signal values for a given one of the sensor signals over a given time period; and
a deadband calculating component configured to calculate a standard deviation of the discrete sensor signal values as the measure of signal variability.

Example 20 is the agricultural machine of any or all previous examples wherein the deadband identifying system comprises:
a signal characteristic capturing component configured to capture a set of discrete sensor signal values for a given one of the sensor signals over a given time period; and
a deadband calculating component configured to calculate the measure of signal variability as at least one of: kurtosis, variance, skewness or range of the discrete sensor signal values.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An agricultural combine, comprising:
a header configured to engage crop during movement of the agricultural combine throughout an agricultural field;
a machine orientation sensor configured to sense an orientation of the header and generate a sensor signal indicative of the sensed orientation;
a deadband identification system that repeatedly and automatically identifies a deadband corresponding to the sensor signal, intermittently, during operation, the deadband identification system comprising:
a signal characteristic capture component that captures a set of discrete sensor signal values of the given sensor signal over a given time period;
a calculation component configured to calculate a measure of signal variability based on the set of discrete sensor signal values;

a deadband identifier that identifies the deadband corresponding to the given sensor signal based on the measure of signal variability, the deadband identifier comprising:
a transform component that transforms the set of discrete sensor signal values into a frequency domain;
a frequency component identifier that identifies frequency components to be filtered; and
a filter that filters out the identified frequency components from the given sensor signal to obtain a filtered sensor signal; and
a control system that generates action signals for controlling the orientation of the header based on the filtered sensor signal.

2. The agricultural combine of claim 1 wherein the calculation component comprises:
a statistical calculation component that statistically identifies the measure of signal variability.

3. The agricultural combine of claim 2 wherein the statistical calculation component is configured to calculate a standard deviation of the discrete sensor signal values as the measure of signal variability and to identify the given deadband based on the standard deviation calculated.

4. The agricultural combine of claim 2 wherein the statistical calculation component is configured to calculate the measure of signal variability as at least one of: kurtosis, variance, skewness or range of the discrete sensor signal values.

5. A method of controlling an agricultural machine, comprising:
sensing a position of a component on the agriculture machine;
generating a sensor signal indicative of the sensed position of the component;
capturing a set of discrete sensor signal values of the sensor signal over a given time period;
automatically identifying a measure of signal variability, indicative of a level of variation in the set of discrete sensor signal values;
repeatedly identifying a deadband corresponding to the sensor signal based on the corresponding measure of signal variability, intermittently, during operation of the agricultural machine, wherein identifying the deadband comprises:
transforming the sensor signal into a frequency domain;
identifying frequency components to be filtered; and
filtering out the identified frequency components from the sensor signal to obtain a filtered sensor signal; and
generating action signals to modify the position of the component based on the filtered sensor signal.

6. The method of claim 5 wherein identifying the measure of signal variability comprises:
calculating a standard deviation of the discrete sensor signal values as the measure of signal variability.

7. The method of claim 5 wherein identifying the measure of signal variability comprises:
calculating the measure of signal variability as at least one of: kurtosis, variance, skewness or range of the discrete sensor signal values.

8. An agriculture machine, comprising:
a controllable subsystem configured to interact with crop during movement of the agricultural machine throughout an agricultural field;
a controllable subsystem sensor configured to sense a characteristic of the controllable subsystem and generate a sensor signal indicative of the sensed characteristic;
a variability identifying component configured to automatically identify a measure of signal variability corresponding to the sensor signal;
a deadband identifying system that identifies a deadband corresponding to the sensor signal based on the corresponding measure of signal variability, intermittently, during the operation of the agricultural machine, the deadband identifying system comprising:
a signal characteristic capturing component configured to capture a set of discrete sensor signal values corresponding to the given sensor signal over a given period of time;
a deadband identifier that identifies the given deadband corresponding to the set of discrete sensor signal values based on the measure of signal variability, the deadband identifier comprising:
a transform component that transforms the set of discrete sensor signal values into a frequency domain;
a frequency component identifier that identifies frequency components to be filtered; and
a filter that filters out the identified frequency components from the given sensor signal to obtain a filtered sensor signal; and
a control system that controls the characteristic based on the filtered sensor signal.

9. The agricultural machine of claim 8 wherein the deadband identifying system comprises:
a deadband calculating component configured to calculate a standard deviation of the discrete sensor signal values as the measure of signal variability for the sensor signal.

10. The agricultural machine of claim 8 wherein the deadband identifying system comprises:
a deadband calculating component configured to calculate the measure of signal variability as at least one of: kurtosis, variance, skewness or range of the discrete sensor signal values.

11. The agricultural machine of claim 8, wherein the controllable subsystem comprises one or more of the following:
a header;
a cutter;
a feeder house;
a feed accelerator;
a thresher;
a thresher rotor;
a separator;
a separator rotor;
a discharge beater;
an elevator;
an auger;
a spout;
a cleaning fan;
a chaffer;
a sieve;
a chopper;
a spreader;
an engine;
a wheel; or
a track.

12. The agricultural machine of claim 8, wherein the controllable subsystem sensor comprises one or more of the following:

a ground speed sensor;
a GPS;
a dead reckoning system;
a LORAN system;
a strike sensor;
a fan speed sensor;
a flow sensor;
a machine state sensor;
a moisture sensor;
an orientation sensor;
a crop property sensor;
a feed rate sensor;
a clean grain sensor;
separator loss sensor; or
cleaning shoe loss sensor.

* * * * *